April 9, 1940.　　　H. K. HYBARGER　　　2,196,922
OPTICAL INSPECTION APPARATUS
Filed Sept. 24, 1936
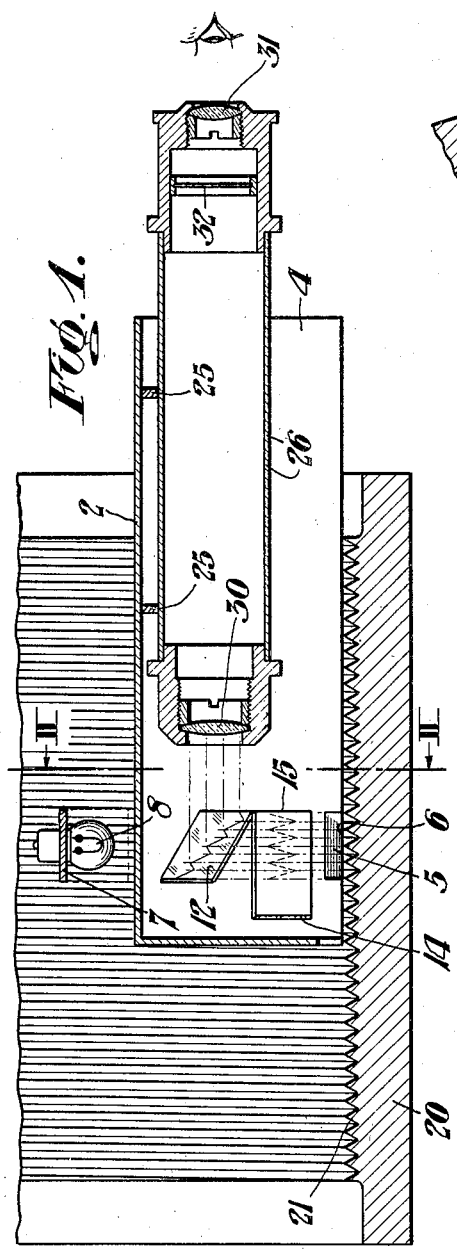
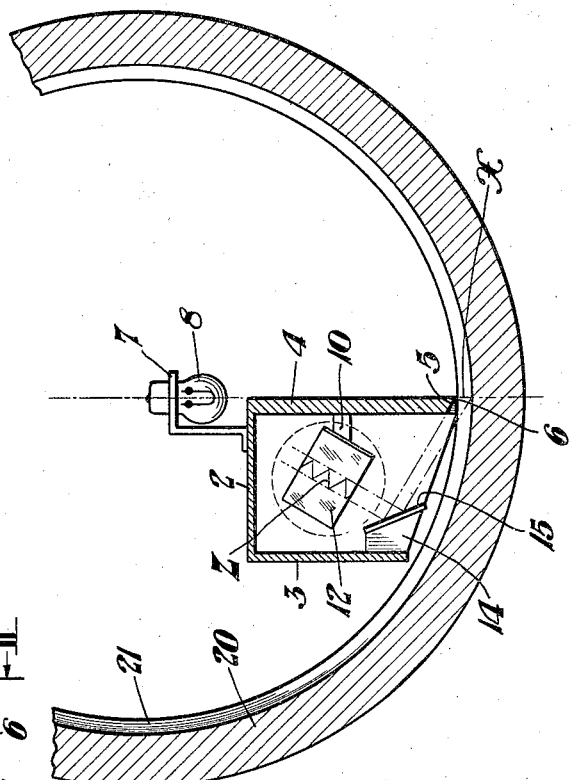
Inventor:
HUGH K. HYBARGER,
by his Attorneys.

Patented Apr. 9, 1940

2,196,922

UNITED STATES PATENT OFFICE 2,196,922

OPTICAL INSPECTION APPARATUS

Hugh K. Hybarger, Elyria, Ohio, assignor to National Tube Company, a corporation of New Jersey Application September 24, 1936, Serial No. 102,414

2 Claims. (Cl. 88—14)

This invention relates to optical inspection apparatus and more particularly to a device which enables the minute inspection of surface conditions, whether internal or external.

In the art of inspecting the threads of an internally threaded pipe coupling, by way of example, considerable difficulty has been experienced in obtaining accurate results. Pipe couplings which are threaded internally to receive the threads on externally threaded pipes should be produced to exacting tolerances. At the present time, two methods are available for the comparison with a standard thread form of internal coupling threads, neither of which, however, is very satisfactory. One method is to cut a section from the coupling and examine it as though the threads were external, which of course destroys the particular coupling inspected. The second method is to make a sulphur cast of the threads, and remove and inspect this cast. This second method is open to all objections which are inherent in any indirect method, and the sulphur cast frequently refuses to part cleanly from the coupling.

For visual inspection, it is difficult to see into a coupling and judge the shape of the threads by the view from the top, and the use of dentists' mirrors and prisms does not remove this objection, as the roundness of the coupling prevents a view which is normal to the thread form.

It is among the objects of the present invention to obtain accurate results in the visual minute examination of surfaces, whether internal or external.

Another object is to provide a novel optical inspection apparatus for inspecting surfaces which eliminates the variances inherent in prior art devices.

Still another object is the provision of a device of the class described which does not require the removal of a sample form and therefore occasion destruction of the particular article being inspected.

The foregoing and other objects will be apparent after referring to the drawing, in which:

Figure 1 is a longitudinal sectional elevation.

Figure 2 is a sectional view on the line II—II of Figure 1.

Referring more particularly to the drawing, the numeral 2 designates the top of the frame of the device of the invention. This frame is of inverted trough-shape and, besides the top 2, comprises a right-angularly depending wall 3, and a substantially spaced parallel wall 4 of materially greater depth.

The lower end of the wall 4 is provided with an aperture 5 which has an inwardly beveled lower edge 6 for a purpose to be later described.

The top 2 of the trough-shaped frame carries a bracket 7 which supports a vertically depending electric lamp 8 whose center line occupies substantially the plane of the outer face of the depending wall 4, all as shown in Figure 2.

The inner face of the depending wall 4 of the trough-shaped frame carries an inwardly extending bracket 10 which supports a canted reflector 12 whose plane is arranged at an approximate 30 degree angle with respect to a horizontal plane.

The inner face of the depending wall 3 of the trough-shaped frame carries a bracket. This bracket 14 carries a reflector 15 which extends toward the lower inwardly beveled edge 6 of the aperture 5 in the longer depending wall 4 and whose plane is at a substantial 22½ degree angle with respect thereto.

From the foregoing, it will be seen that light will be projected from the vertically depending electric lamp 8 carried by the bracket 7 on the top 2 of the inverted trough-shaped frame along the outer face of the downwardly depending wall 4 and onto the adjacent portion of the surface to be minutely inspected.

In the present instance, the device of the invention is shown as used on a coupling 20 having internal screw-threads 21. Therefore, the inverted trough-shaped frame is disposed to extend into the coupling 20 with the beveled lower edge portion 6 of the aperture 5 of the downwardly depending wall 4 in close proximity to the internal screw-threads 21.

While in this position, the beveled lower edge portion 6 of the downwardly depending wall 4 intercepts the light projected by the vertically depending electric lamp 8 and causes the formation of a shadow which is indicated in the drawings at X. This results in obtaining what, for all practical purposes, amounts to a section of the internal screw-threads 21 by the use of the line of demarkation between the illuminated and unilluminated surfaces. This image is projected onto the reflector 15 which is supported by the bracket 14 on the interior surface of the downwardly depending wall 3 from which the image is projected toward the axis of the coupling 20. The reflector 12 which is supported by the bracket 10 on the interior surface of the downwardly depending wall 4 receives the image from the reflector 15 and projects it in a direction which is parallel to the axis of the coupling. This presents a view of the thread form when the source of light from the vertically depending electric lamp 8 is perpendicular to the thread; and viewed at other than 90 degrees to the light source (that is fore-shortened), the height of the thread being less than its true proportion to its width. However, by inclining the light source to the diameter of the coupling 20, the relative thread height is altered, and when the angle between the beam of light and the perpendicular is one-half of that between the viewing angle and the tangent, the thread will be shown in its true form. This is essentially true when the height of the thread contour is small in relation to the diameter of the coupling, as is the case with pipe threads. In other cases, it is necessary to correct the comparison figure to compensate for the error due to the curvature of the contour.

The light rays reflected from a small illuminated portion adjacent the shadow X fall upon the reflector 15 at the same diametral plane as the light source and the relief in the inverted trough-shaped frame. The reflector 15, as before stated, directs the rays of light upon the reflector 12 which turns the beam from the diametral plane of observation through 90 degrees and directs it axially of the coupling 20.

In order that the image projected upon the reflector 12 may be inspected, the interior surface of the top 2 of the inverted trough-shaped frame carries a pair of brackets 25 which support a tubular housing 26 which extends therefrom. The inner end of the tubular housing 26 carries a conventional telescopic object-lens 30, while the outer end thereof carries a conventional telescopic eye-piece lens 31. Immediately in advance of the eye-piece 31, the tubular housing 26 is provided with a reticle 32 which carries a comparison outline of the surface to be minutely inspected. In the present instance, the comparison outline is a standard thread form (not shown). The construction and arrangement of the elements within the tubular sleeve 26 is such that the object-lens 30 brings the rays of light from the reflector 12 to a focus at a plane, and the reticle 32 carrying the comparison outline is situated at this plane.

The eye-piece 31 of the tubular housing 26 is located beyond the reticle 32 a distance equal to the focal length of the eye-piece lens 31 and revolves the light beam into parallel rays for vision by the operator of both the thread image and the comparison image on the reticle 32. The reticle 32 is formed of transparent glass carrying on it an outline of a perfect tread form and appearing through te eye-piece 31 as if it coincided with or was superimposed on the thread image, causing any departure from the thread form to appear as a difference in contour.

In order to enhance the accuracy of the device of the invention, suitable micrometer screws may, if desired, be provided for enabling the extremely accurate horizontal and vertical adjustment of the inverted trough-shaped frame.

The device of the invention can be made to function on any surface upon which a shadow can be produced, so long as it functions to enable the viewing of a line of demarkation from an angle more nearly parallel to the plane of the surface than the angle formed with the source of light.

While I have shown and described one specific embodiment of this invention, it will be understood that I do not wish to be limited exactly thereto, since various modifications may be made without departing from the scope of the invention, as defined by the following claims.

I claim:

1. An apparatus for the optical inspection of interior contours such as internal screw-threads comprising a wall member having an undercut at one of its ends, means for projecting light rays along the side of said wall member which is opposite the undercut and onto the contour to be inspected, means for viewing the section of the interior contour defined by said light rays and the undercut of said wall member, said viewing means being disposed on the side of said wall member having the undercut and including a telescope system and means for transmitting the view of the contour into the telescope system.

2. An apparatus for the optical inspection of interior contours such as internal screw-threads comprising a wall member having an undercut at one of its ends, means for projecting light rays along the side of said wall member which is opposite the undercut and onto the contour to be inspected, means for viewing the section of the interior contour defined by said light rays and the undercut of said wall member, said viewing means being disposed on the side of said wall member having the undercut and including a telescope system and means for transmitting the view of the contour into the telescope system and means within said telescope system for comparing the transmitted view with a standard contour.

HUGH K. HYBARGER.